United States Patent
Wang et al.

(10) Patent No.: US 8,520,935 B2
(45) Date of Patent: Aug. 27, 2013

(54) 2D TO 3D IMAGE CONVERSION BASED ON IMAGE CONTENT

(75) Inventors: Xiaoling Wang, San Jose, CA (US); Alexander Berestov, San Jose, CA (US); Jianing Wei, San Jose, CA (US); Xue Tu, San Jose, CA (US)

(73) Assignee: Sony Corporation, Tokyo (JP)

( * ) Notice: Subject to any disclaimer, the term of this patent is extended or adjusted under 35 U.S.C. 154(b) by 423 days.

(21) Appl. No.: 13/019,640

(22) Filed: Feb. 2, 2011

(65) Prior Publication Data
US 2011/0188780 A1 Aug. 4, 2011

Related U.S. Application Data

(60) Provisional application No. 61/301,425, filed on Feb. 4, 2010.

(51) Int. Cl.
*G06K 9/00* (2006.01)

(52) U.S. Cl.
USPC .......................................................... 382/154

(58) Field of Classification Search
USPC .......................................................... 382/154
See application file for complete search history.

(56) References Cited

U.S. PATENT DOCUMENTS

| 2005/0053276 A1 | 3/2005 | Curti et al. | |
|---|---|---|---|
| 2008/0150945 A1* | 6/2008 | Wang et al. | 345/427 |
| 2010/0014781 A1 | 1/2010 | Liu et al. | |

FOREIGN PATENT DOCUMENTS

| EP | 1 507 232 | 2/2005 |
|---|---|---|
| WO | WO 99/30280 | 12/1998 |
| WO | WO 2007/063478 | 6/2007 |
| WO | WO 2007/148219 | 12/2007 |
| WO | WO 2008/075276 | 6/2008 |
| WO | WO 2008/118113 | 10/2008 |
| WO | WO 2010/088840 | 8/2010 |

OTHER PUBLICATIONS

Battiato, S. et al, "Depth-Map Generation by Image Classification", http://citeseerx.ist.psu.edu/viewdoc/download?doi=10.1.1.109.7959&rep=rep1&type=pdf, dated Apr. 26, 2004, 10 pages.
Wei, Qingqing, "Converting 2D to 3D: A Survey," Information and Communication Theory Group (ICT); Faculty of Electrical Engineering, Mathematics and Computer Science; Delft University of Technology, the Netherlands; Dec. 2005, 40 pages.
Nedovic, V. et al., "Depth Estimation Via Stage Classification," Intelligent Systems Lab Amsterdam (ISLA), University of Amsterdam; Philips Research Laboratories Eindhoven, Jun. 20, 2008, 4 pages.
Guo, G., et al, "2D to 3D Convertion Based on Edge Defocus and Segmentation," ICASSP 2008, 2008 IEEE, pp. 2181-2184.
Van De Pol, E, et al, "Semi-Automatic Figure-Ground Segmentation for 2D-to-3D Image Conversion based on Color and Compactness," Technical note TN-2009-00408; Koninklijke Philips Electronics, N.V. 2009; Issued Aug. 2009, 66 pages.
PCT Notification of Transmittal of the International Search Report and Written Opinion of the International Searching Authority for International Application No. PCT/US2011/023489, mailed Jun. 7, 2011, 17 pages.

* cited by examiner

*Primary Examiner* — Wesley Tucker
(74) *Attorney, Agent, or Firm* — Haverstock & Owens LLP

(57) ABSTRACT

A method for converting a 2D image into a 3D image includes receiving the 2D image; analyzing content of the received 2D image; determining a 2D-to-3D image conversion method based on a result of the content analysis; generating the 3D image by applying the determined method to the received 2D image; and providing the generated 3D image.

17 Claims, 9 Drawing Sheets

2D TO 3D IMAGE CONVERSION BASED ON IMAGE CONTENT

CROSS REFERENCE TO RELATED PATENT APPLICATIONS

This application claims the priority and benefit of U.S. Provisional Application No. 61/301,425, filed on Feb. 4, 2010, titled "2D TO 3D Image Conversion Based on Image Categorization," the entire contents of which are incorporated herein by reference.

TECHNICAL FIELD

The present disclosure relates to methods and systems for converting an image in a two-dimensional ("2D") format into an image in a three-dimensional format ("3D") based on content of the 2D image, such as image categorization (classification), object identification, etc.

BACKGROUND

Three-dimensional display technologies can provide 3D presentation of image data and create 3D effect. A perception of 3D content may involve a third dimension of depth, which can be perceived in a form of binocular disparity by a human visual system. Since left and right eyes of a human are at different positions, they perceive slightly different views of a surrounding world. The human's brain can reconstruct depth information from these different views. To simulate this phenomenon, a 3D display can create two slightly different images of every scene and present them to each individual eye. With an appropriate disparity and calibration of parameters, an accurate 3D perception can be realized.

As 3D display technologies such as 3D TVs are now considered as a next major breakthrough in the ultimate visual experience of media, a demand for 3D content is rapidly increasing. The conversion of image data from 2D to 3D, a fast way to obtain 3D content from existing 2D content, has been extensively studied. Nevertheless, in converting 2D images into 3D images, most conventional technologies apply a same method to different images, regardless what type of content is included in the images. These technologies may either create unsatisfied 3D effect for certain content, or significantly increase the computational complexity.

SUMMARY

The present disclosure includes an exemplary method for converting a 2D image into a 3D image. Embodiments of the method include receiving the 2D image, analyzing content of the received 2D image, and determining a 2D-to-3D image conversion method based on a result of the content analysis. Embodiments of the method may also include generating the 3D image by applying the determined method to the received 2D image, and providing the generated 3D image.

An exemplary system in accordance with the present disclosure comprises a user device to receive a 2D image and a 2D-to-3D image converter coupled to the user device. The 2D-to-3D image converter analyzes content of the received 2D image, and determines a 2D-to-3D image conversion method based on a result of the content analysis. In some embodiments, the 2D-to-3D image converter also generates the 3D image by applying the determined method to the received 2D image, and provides the generated 3D image.

It is to be understood that both the foregoing general description and the following detailed description are exemplary and explanatory only and are not restrictive of the invention, as claimed.

DETAILED DESCRIPTION

Reference will now be made in detail to the exemplary embodiments illustrated in the accompanying drawings. Wherever possible, the same reference numbers will be used throughout the drawings to refer to the same or like parts.

Methods and systems disclosed herein address the above described needs. For example, depending on content of 2D images, methods and systems disclosed herein can adopt different, corresponding methods to convert the 2D images into 3D images.

Figure 1:
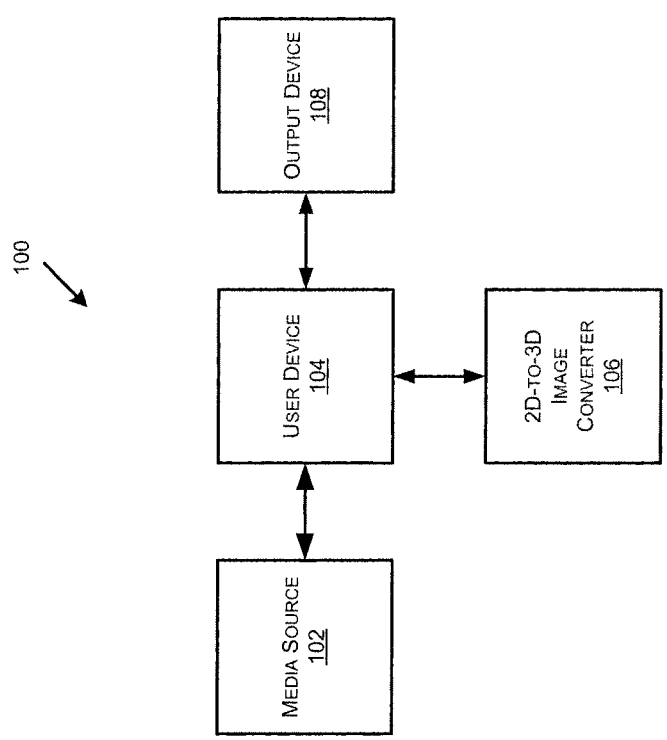
FIG. 1 illustrates a block diagram of an exemplary system consistent with the invention.

FIG. 1 illustrates a block diagram of an exemplary system 100 consistent with the invention. As shown in FIG. 1, exemplary system 100 may comprise a media source 102, a user device 104, a 2D-to-3D image converter 106, and an output device 108. Each of the components is operatively connected to one another via a network or any type of communication links that allow transmission of data from one component to another. The network may include Local Area Networks (LANs) and/or Wide Area Networks (WANs), and may be wireless, wired, or a combination thereof.

Media source 102 can be any type of storage medium capable of storing imaging data, such as video or still images. For example, media source 102 can be provided as a CD, DVD, Blu-ray disc, hard disk, magnetic tape, flash memory card/drive, volatile or non-volatile memory, holographic data storage, and any other type of storage medium. Media source 102 can also be an image capturing device or computer capable of providing imaging data to user device 104. For example, media source 102 can be a camera capturing imaging data and providing the captured imaging data to user device 104.

As another example, media source 102 can be a web server, an enterprise server, or any other type of computer server. Media source 102 can be a computer programmed to accept requests (e.g., HTTP, or other protocols that can initiate data transmission) from user device 104 and to serve user device 104 with requested imaging data. In addition, media source 102 can be a broadcasting facility, such as free-to-air, cable, satellite, and other broadcasting facility, for distributing imaging data.

As further example, media source 102 can be a client computing device. Media source 102 can request a server (e.g., user device 104 or 2D-to-3D image converter 106) in a data network (e.g., a cloud computing network) to convert a 2D image into a 3D image.

User device 104 can be, for example, a computer, a personal digital assistant (PDA), a cell phone or smartphone, a laptop, a desktop, a tablet PC, a media content player, a set-top box, a television set including a broadcast tuner, a video game station/system, or any electronic device capable of providing or rendering imaging data. User device 104 may include software applications that allow user device 104 to communicate with and receive imaging data from a network or local storage medium. As mentioned above, user device 104 can receive data from media source 102, examples of which are provided above.

As another example, user device 104 can be a web server, an enterprise server, or any other type of computer server. User device 104 can be a computer programmed to accept requests (e.g., HTTP, or other protocols that can initiate data transmission) from, e.g., media source 102, for converting an image into a 3D image, and to provide the 3D image generated by 2D-to-3D image converter 106. In addition, user device 104 can be a broadcasting facility, such as free-to-air, cable, satellite, and other broadcasting facility, for distributing imaging data, including imaging data in a 3D format.

As shown in FIG. 1, 2D-to-3D image converter 106 can be implemented as a software program executing in a processor and/or as hardware that performs a 2D-to-3D image conversion based on image content. A 2D image can be one of video frames or still images in a 2D format, can be in color, black/white, or grayscale, and CaO be in one color space or another color space. 2D-to-3D image converter 106 can, for example, analyze content of a 2D image, and apply a corresponding method to convert the 2D image into a 3D image. The 2D-to-3D conversion based on image content will be further described below.

Output device 108 can be, for example, a computer, personal digital assistant (PDA), cell phone or smartphone, laptop, desktop, a tablet PC, media content player, set-top box, television set including a broadcast tuner, video game station/system, or any electronic device capable of accessing a data network and/or receiving imaging data. In some embodiments, output device 108 can be a display device such as, for example, a television, monitor, projector, digital photo frame, display panel, or any other display device. In certain embodiments, output device 108 can be a printer.

While shown in FIG. 1 as separate components that are operatively connected, any or all of media source 102, user device 104, 2D-to-3D image converter 106, and output device 108 may be co-located in one device. For example, media source 102 can be located within or form part of user device 104 or output device 108, 2D-to-3D image converter 106 can be located within or form part of media source 102, user device 104, or output device 108, and output device 108 can be located within or form part of user device 104 or media source 102. It is understood that the configuration shown in FIG. 1 is for illustrative purposes only. Certain components or devices may be removed or combined and other components or devices may be added.

Figure 2:
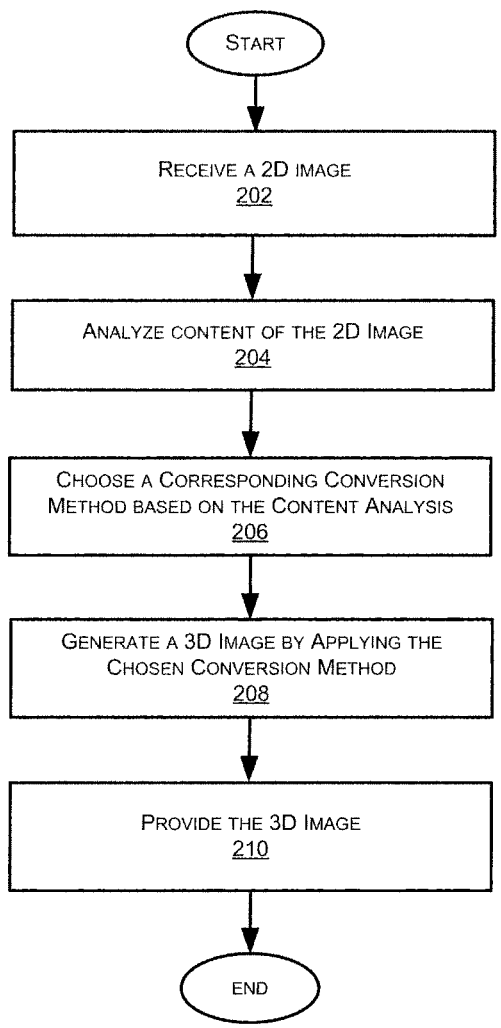
FIG. 2 is a flow chart illustrating an exemplary 2D-to-3D image conversion based on image content.

FIG. 2 is a flow chart illustrating an exemplary 2D-to-3D image conversion based on image content. As shown in FIG. 2, a 2D image is received (step 202). Content of the 2D image may be analyzed (204). The content analysis may include, for example, image categorization, object identification, or the like. Based on a result of the content analysis, a corresponding 2D-3D image conversion method may be chosen or determined (206). The conversion method may be but is not limited to, e.g., shifting a left or right eye image, shifting image pixels depending on their positions, shifting edges of objects in the 2D image, shifting image frequencies, creating a disparity between left and right eye images based on a 3D model, creating a 3D image based on a depth map generated based on the result of content analysis, etc. Applying the chosen method to the 2D image, a 3D image can be generated (step 208).

For example, in some embodiments, a 2D image may be classified as one of image categories and/or subcategories based on image content, and a corresponding method is adopted to convert the 2D image into a 3D image according to the categorization and/or subcategorization. In certain embodiments, based on the categorization and/or subcategorization, a corresponding method may be employed to assign depth information to the image, and generate a 3D image based on the depth information. For another example, in some embodiments, each object in a 2D image may be identified or classified as one of object categories (or classes). Based on the identified object class, their positions, and/or size, etc, a corresponding method may be chosen to generate a 3D image. In certain embodiments, based on the identified object class, their positions, and/or size, etc, a corresponding method may be used to assign depth information to the identified object class, and generate a 3D image based on the depth information.

Image classification and object identification may be employed separately or combined in any order to perform 2D-to-3D conversion. Depth generation based on image content, e.g., image classification or object identification, may also be optional in some embodiments. The image classification, the object identification, and the depth generation are just examples of 2D-to-3D image conversion based on image content. Other methods consist with the present disclosure may also be adopted to implement 2D-to-3D image conversion based on image content.

Figure 3:
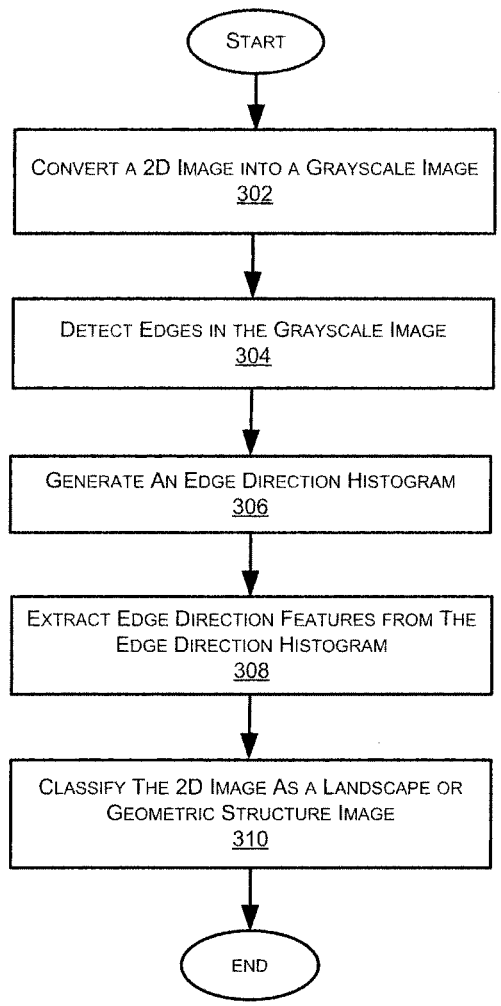
FIG. 3 is a flow chart illustrating an exemplary image categorization.

For example, FIG. 3 is a flow chart illustrating an exemplary image categorization. Image categorization (or classification) may be performed to group images into semantically meaningful categories (classes) and/or subcategories (subclasses) based on content of images, e.g., some visual features of the images. In some embodiments, for example, a 2D image can be classified as, e.g., a landscape image or a geometric structure image. A landscape image may correspond to an image containing natural scenes having vertically changing depths and a presence of a horizon, while a geometric structure image may contain man-made objects such as buildings, roads, room interiors, etc. Therefore, a geometric structure image may have strong vertical and horizontal edges, while a landscape image may tend to have randomly distributed edge directions. Accordingly, the edge direction distribution may be one of visual features to distinguish a landscape image from a geometric structure image. In some embodiments, an edge direction histogram may be employed for image classification.

With reference to FIG. 3, a 2D image may be converted into a grayscale image (step 302). In the grayscale image, a value of a pixel carries intensity information. For example, the grayscale image may include shades of gray, varying from black at a weakest intensity to white at a strongest intensity. In the grayscale image, edges may be detected (step 304). Edges in an image may be regions with strong intensity contrasts. The edge detection may reduce an amount of data to be analyzed and filter out useless information, while preserving structural properties in the image. In some embodiments, a conventional Canny edge detector may be used to detect edges in the grayscale image.

Based on the detected edges, an edge direction histogram may be generated (step 306). In some embodiments, for example, an eight-bin edge direction histogram may be used to represent the edge directions where the eight bins correspond to edge directions quantized at a 45° interval. In some embodiments, to compensate for different image sizes, the edge direction histogram may be normalized, for example:

$$H(i)=H(i)/n, i \in [0, \ldots, 7]$$

where H(i) is the count in bin of the edge direction histogram and n is the total number of edge points in the grayscale image. Edge direction features may be extracted from the edge direction histogram (step 308).

After the edge direction features are extracted, they may be provided to a classifier to classify the 2D image based on the edge direction features. In some embodiments, the 2D images are classified as, e.g., a landscape or geometric structure class (step 310). In some embodiments, a Bayesian classifier may be utilized for the image classification. In certain embodiments, a discriminant function may be employed for the image classification based on the extracted features of a given image (e.g., the 2D image). The discriminant function may be defined as, for example:

$$g_i(\vec{x}) = \frac{1}{2\pi\sqrt{|\Sigma_i|}} \exp\left[-\frac{1}{2}(\vec{x}-\vec{\mu}_i)^T \Sigma_i^{-1}(\vec{x}-\vec{\mu}_i)\right], i = 0, 1$$

where $\vec{x}$ is a feature vector of the given image, $\vec{\mu}_i$ is a mean vector of training images of class i (e.g., a landscape class or a geometric structure class), and $\Sigma_i$ is a covariance matrix of the training images of class i. Therefore, the discriminant function is an evaluation of a probability density function for each image class at a given sample feature vector of the given image, and the sample feature (e.g., one of the extracted edge direction features) is assigned to a class with a highest probability.

The class of landscape images and the class of geometric structure images are exemplary image classification. Any types of image classification consistent with disclosed embodiments may also be used. Also any number of classifications may be used.

In some embodiments, after a 2D image is classified as one of image categories (or classes), it may be further classified as one of subcategories (subclasses) of the image categories. For example, in some embodiments, if a 2D image is classified as a geometric structure image, it may be further classified as, e.g., an indoor image or an outdoor image (also called a city image). An outdoor image tends to have uniform spatial lighting/color distribution. For example, in the outdoor image, a sky may be blue and on a top of the image, while a ground is at a bottom of the image. On the other hand, an indoor image tends to have more varied color distributions. Therefore, in some embodiments, spatial color distribution features may be used to distinguish between an indoor image and an outdoor image.

Figure 4:
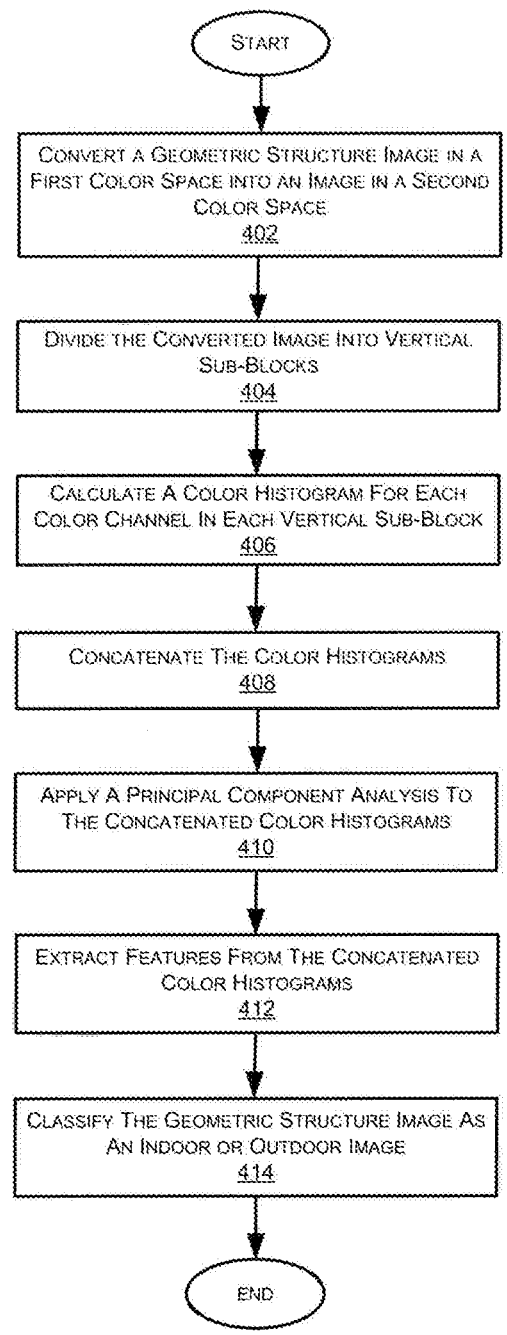
FIG. 4 is a flow chart illustrating an exemplary image subcategorization.

For example, FIG. 4 is a flow chart illustrating an exemplary method for image subclassification. As shown in FIG. 4, a 2D image in a first color space may be converted into an image in a second color space (step 402). For example, in some embodiments, a 2D image in a RGB color space may be converted into an Ohta color space image. In a RGB color space, red (R), green (G), and blue (B) light are added together in various ways to reproduce a broad array of colors. An Ohta color space is a linear transformation of the RGB color space.

In the Ohta color space, color axes are three largest eigenvectors of the RGB color space, which may be derived through principal component analysis of a large selection of natural images. In some embodiments, color channels of the Ohta color space may be defined by, for example:

$$I_1 = R+G+B$$

$$I_2 = R-B$$

$$I_3 = R-2G+B$$

where $I_1$ is an intensity component, and $I_2$ and $I_3$ are roughly orthogonal color components. $I_2$ and $I_3$ may resemble chrominance signals produced by opponent color mechanisms of an human visual system. An advantage of the Ohta color space is that the three color channels are approximately decorrelated. The decorrelation may make the Ohta color space suitable for computing per-channel histograms.

Referring back to FIG. 4, in order to represent local spatial color distribution, the converted image in the second color space (e.g., a Ohta color space) may be divided into a plurality of sub-blocks vertically (step 404). For example, in some embodiments, the image may be divided into four sub-blocks vertically. Then a color histogram may be calculated or generated for each color channel in each sub-block (step 406). A combined color histogram may be generated by concatenating the calculated color histograms (step 408). In some embodiments, to compensate for different image sizes, the combined color histogram may be normalized. In certain embodiments, a principal component analysis may be applied to the combined color histogram to reduce dimensionality of a color distribution feature vector to be derived from the color histograms (step 410).

Color distribution features may be extracted from the combined (concatenated) color histogram (step 412). The extracted features may be provided to a classifier to classify the 2D image as one of subcategories (subclasses). For example, in some embodiments, based on the extracted color distribution features, a geometric structure image may be further classified as, e.g., an indoor or outdoor image (step 414). In certain embodiments, a k-Nearest-Neighbor classifier may be adopted for the image subclassification. A training set may be constructed by extracting features from a large set of geometrical structure images. Dissimilarity may be based on an Euclidean distance between a test feature vector of a given test image (e.g., a geometric structure image) and feature vectors in the training set. After selecting k nearest neighbors in the training set to the test image, a class label (e.g., an indoor image or an outdoor image) with more occurrences may be then assigned to the test feature vector.

The subclasses of indoor images and outdoor images are exemplary image subclassification. Any types and number of image subclassifications consistent with disclosed embodiments may also be used.

Figure 5A:
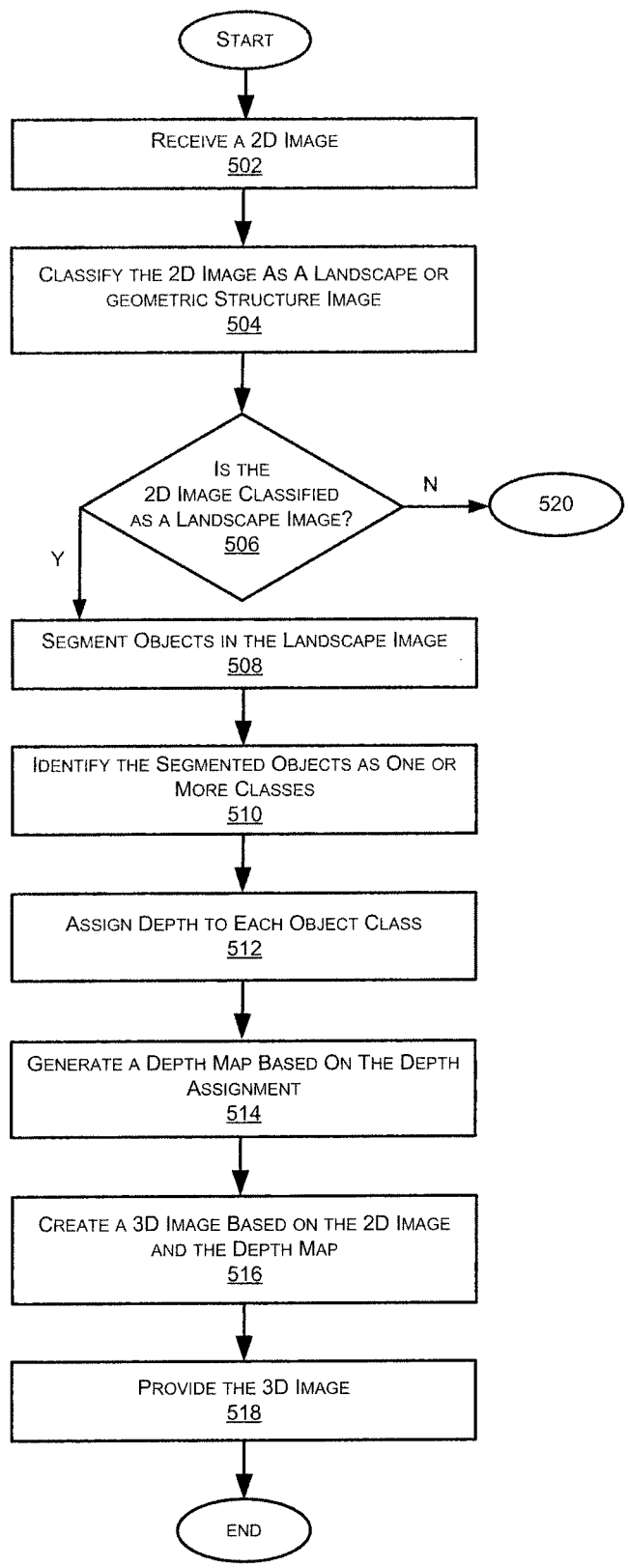
FIG. 5A is a flow chart illustrating an exemplary 2D-to-3D image conversion based on image categorization.
Figure 5B:
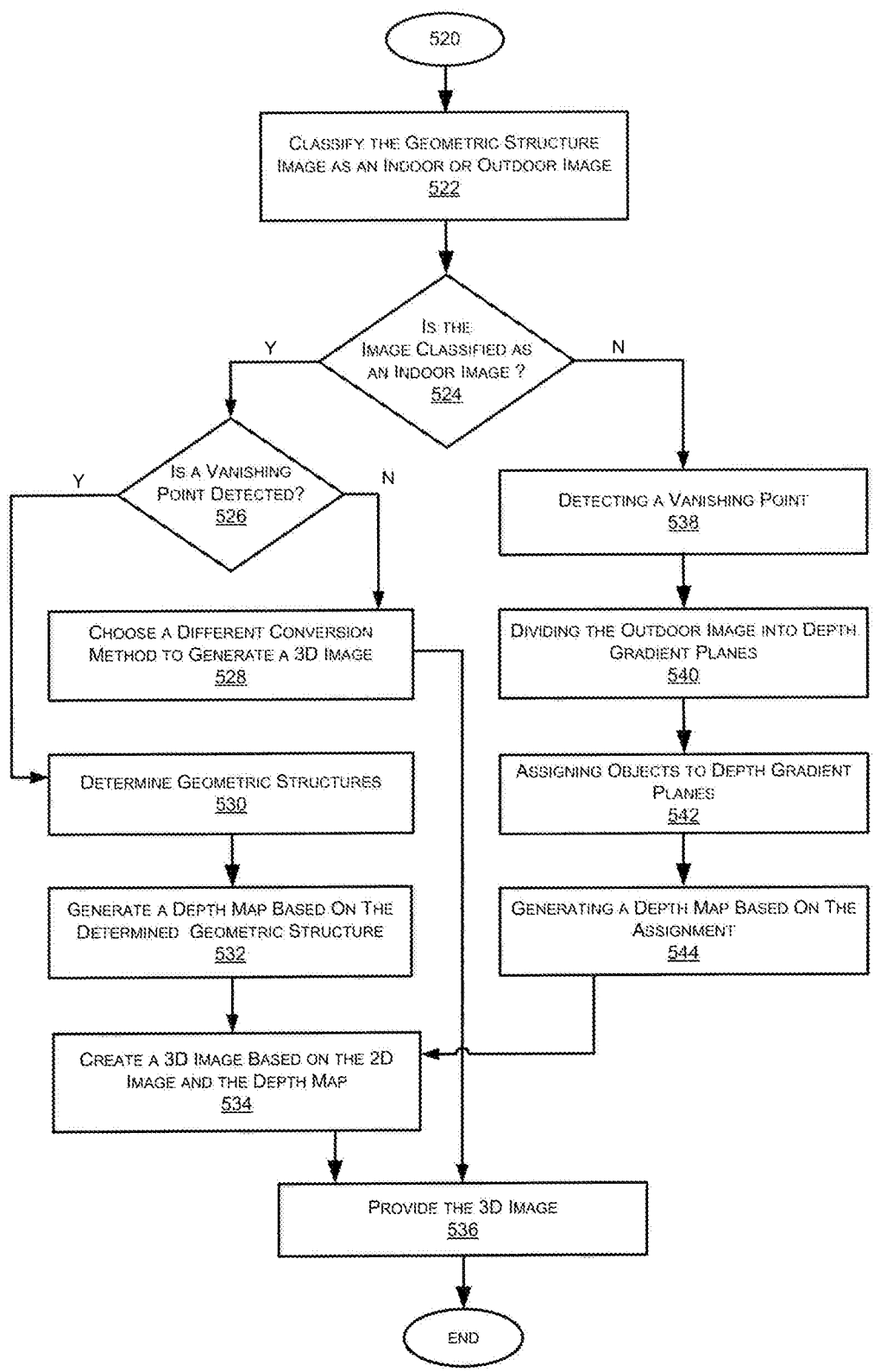
FIG. 5B is a flow chart illustrating another exemplary 2D-to-3D image conversion based on image categorization.

Referring back to FIG. 2, based on a result of the content analysis, e.g., the above-described image categorization/subcategorization and/or image object identification, a corresponding 2D-3D image conversion method may be chosen to generate a 3D image. FIGS. 5A-B describe exemplary methods for generating a 3D image based on image categorization/subcategorization and/or image object identification. With reference to FIG. 2, the generated 3D image is provided for output (step 210). In some embodiments, for example, the 3D image may be displayed. In other embodiments, for example, the 3D image may be rendered for printing, etc.

FIG. 5A is a flow chart illustrating an exemplary 2D-to-3D conversion based on an image categorization (classification). As shown in FIG. 5A, a 2D image is received (step 502). Content of the 2D image may be analyzed, and is used to classify the 2D image as one of categories and/or sub-categories, as described above. In some embodiments, for example, the 2D image may be classified as, e.g., a landscape image or a geometric structure image (step 504), as described above. The classification is checked to determine whether the 2D image is classified as one certain category (e.g., a landscape image) (step 506).

In some embodiments, based on the image classification, a corresponding approach may be adopted for converting the 2D image into a 3D image. For example, if the 2D image is not classified as a landscape image, the method proceeds to step 520, which will be further described with reference to FIG. 5B. Otherwise, if the 2D image is classified as a landscape image, a different method may be adopted for converting the 2D image into a 3D image. For example, objects in the image may be segmented (step 508). Each of the segmented objects may be identified or classified as one of object categories (or classes) (step 510). For example, in some embodiments, a horizon may present in a landscape image and makes it possible to separate a sky and a ground. Accordingly, each of the segmented objects in a landscape image may be identified or classified as, e.g., a sky, a ground, one or more vertical structures, etc. In some embodiments, based on the object identification or classification, a corresponding method may be adopted for converting the 2D image into a 3D image.

In some embodiments, based on the object identification or classification, depth information may be assigned to each of the object categories or classes (step 512). A depth map may be generated or derived based on the depth assignment (step 514). A depth map may be represented as a grayscale image with an intensity value of each pixel registering its depth. Then, an appropriate disparity between left and right eye images (which is also called parallax) may be calculated from the depth map. Different categories of images and/or objects in the images may have different image layouts. Accordingly, a way to reconstruct a depth map may vary with content of an image. Thus, in some embodiments, a 2D-to-3D image conversion may be based on an understanding of image content, e.g., image categorization/subcategorization, object identification or classification, ect.

Figure 7:
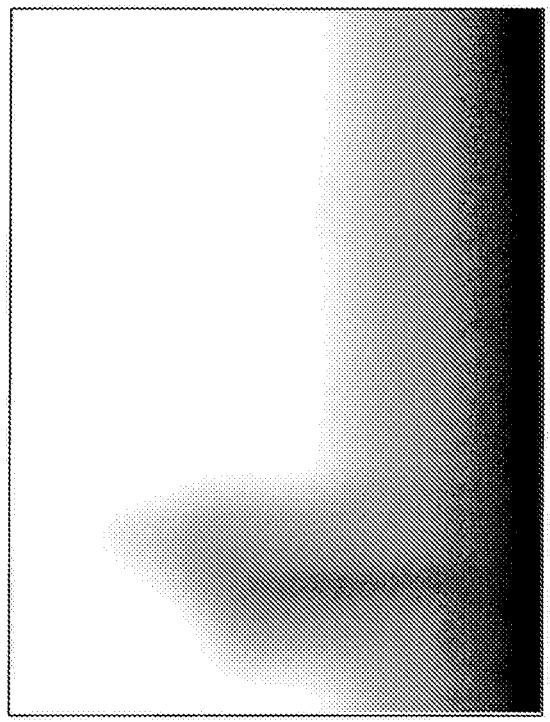
FIG. 7 illustrates an exemplary depth map for the image of FIG. 6.
Figure 6:
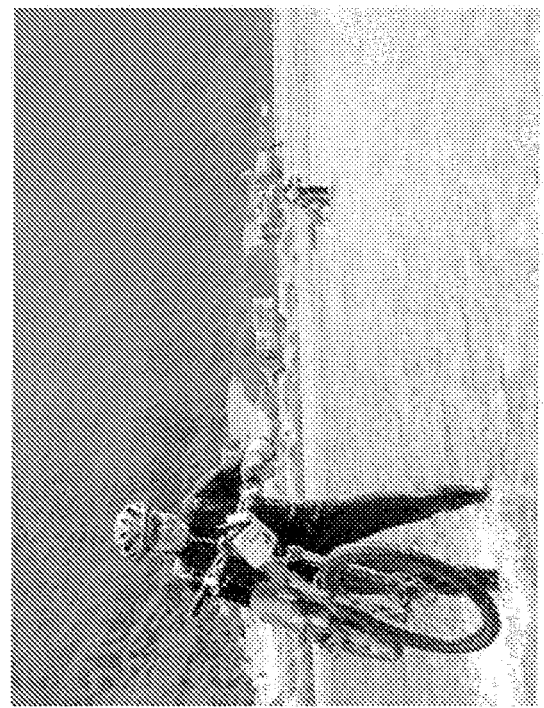
FIG. 6 illustrates an exemplary 2D image.
Figure 8:
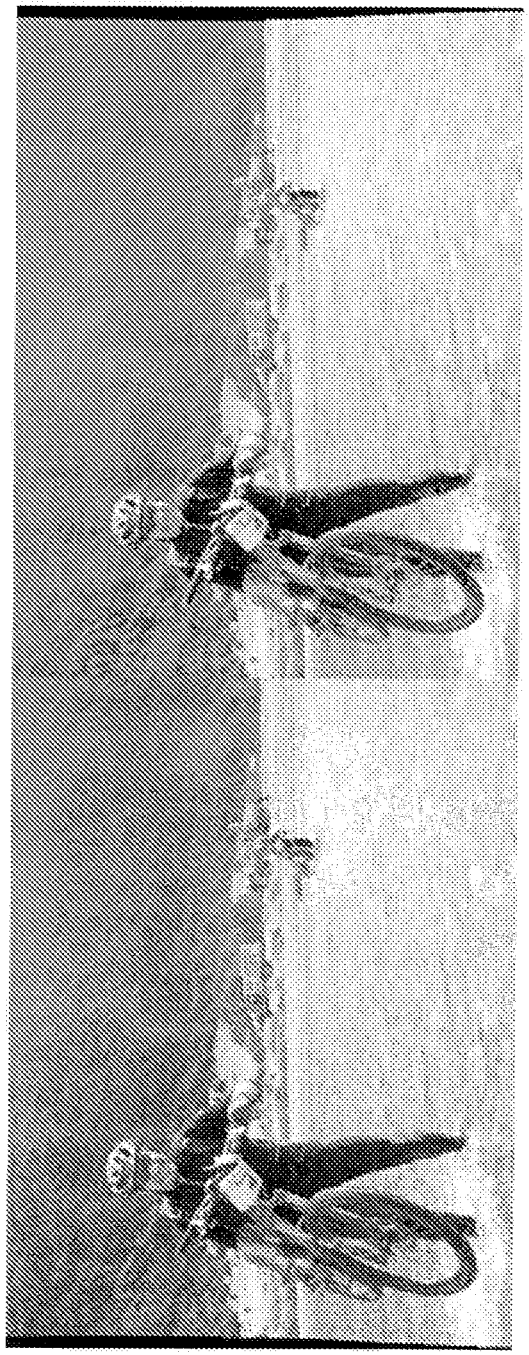
FIG. 8 illustrates an exemplary resulting stereo pair of images based on the image of FIG. 6 and the depth map in FIG. 7.

With reference to FIG. 5A, in some embodiments, based on the 2D image and/or the depth map, a corresponding method may be employed to create a 3D image (step 516). For example, FIG. 6 illustrates an exemplary 2D image, FIG. 7 illustrates an exemplary depth map generated for the image of FIG. 6, and FIG. 8 illustrates an exemplary resulting stereo pair of images based on the image of FIG. 6 and the depth map in FIG. 7, according to the above-presented methods.

Referring back to FIG. 5A, after the 3D image is created, it is provided for output (step 518). In some embodiments, for example, the 3D image may be displayed. In other embodiments, for example, the 3D image may be rendered for printing, etc.

FIG. 5B is a flow chart illustrating another exemplary 2D-to-3D image conversion based on an image classification. After a 2D image is classified as one of image categories (classes), e.g., a geometric structure image (step 520), it may be further classified into one of image subcategories (sub-classes), e.g., an indoor or outdoor image (step 522). After the subcategorization (subclassification), it is determined whether the 2D image is classified as a certain subcategory (e.g., an indoor geometric structure image) (step 524). In some embodiments, based on the image subcategorization, a corresponding method may be employed for generating a 3D image. In certain embodiments, based on the image subcategorization, a corresponding method may be adopted to generate a depth map, which may be used to generate a 3D image.

In a geometric structure image, for example, because of prevalence of edges, vanishing point detection may be applied and geometric structures are determined. A depth map may be then assigned based on a location of a vanishing point and geometric directions of vanishing lines. The vanishing point represents a most distant point from an observer, and the vanishing lines of the geometric structures represent a direction of depth increase. The vanishing lines converge at the vanishing point. Any method known to those skilled in the art may be used to determine the vanishing point and vanishing lines of the geometric structures.

In some embodiments, if a geometric structure image is subclassified as an indoor image, it is determined whether the image includes a vanishing point (step 526). If no vanishing point is detected, any other conversion method described above may be chosen to generate a 3D image (528). Otherwise, if a vanishing point is detected, geometric structures of objects in the image are determined to find vanishing lines (step 530). Based on a location of the vanishing point and geometric directions of the vanishing lines, a depth map may be generated or derived (step 532).

Based on the 2D image and/or the generated depth map, a corresponding method may be employed to create a 3D image (step 534). After the 3D image is generated, it is provided for output (step 536), as described above.

For another example, in some embodiments, if a geometric structure image is subclassified as an outdoor image, the image may be examined to detect a vanishing point, based on, e.g., brightness (step 538). After that, the outdoor image may be divided into one or more depth gradient planes (step 540), In some embodiments, objects in the outdoor image may be extracted or segmented, Each object may be then assigned to one of the depth gradient planes (step 542). Based on the depth assignment, a depth map may be generated or derived (step 544). The method then proceeds to perform step 534 and other steps, as described above.

Detecting a vanishing point is just an exemplary method for generating a 3D image and/or deriving a depth map. Any other method, such as a conventional box-fitting method, or a 3D model, may also be used.

It is understood that the above-described exemplary process flows in FIGS. 2-5B are for illustrative purposes only. Certain steps may be deleted, combined, or rearranged, and additional steps may be added.

Figure 9:
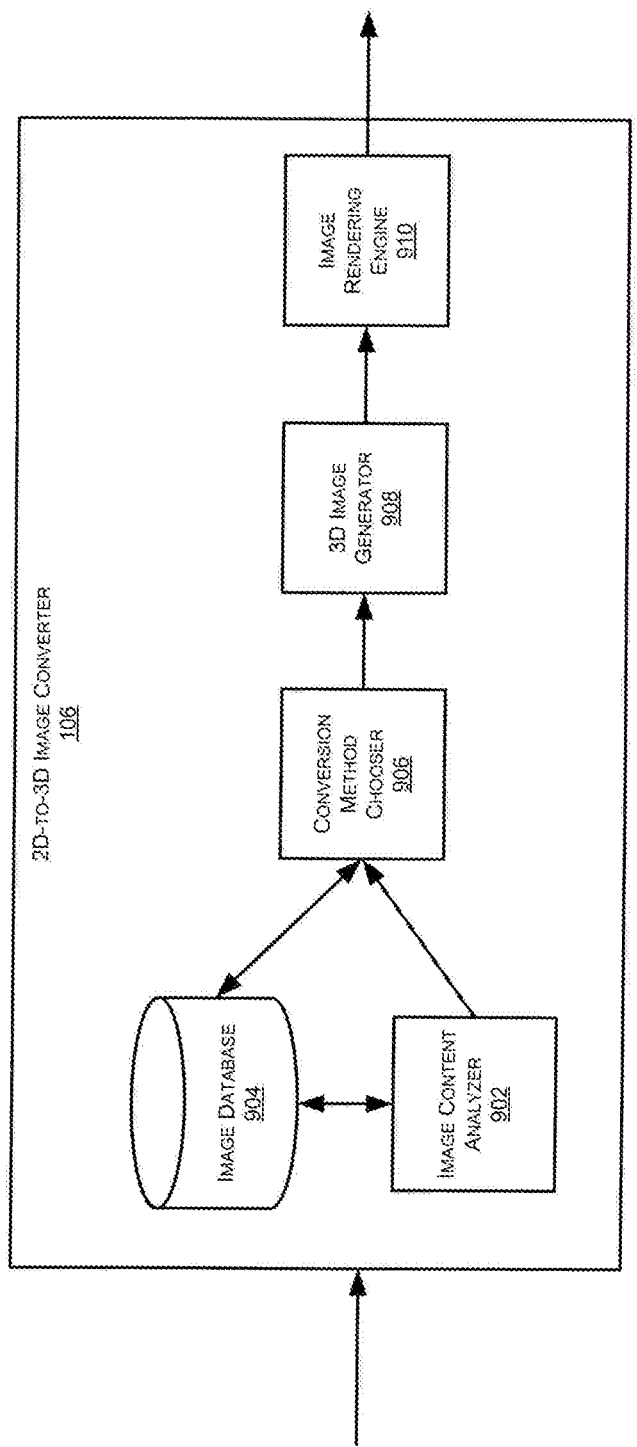
FIG. 9 is a block diagram illustrating an exemplary 2D-to-3D image converter 106 in the exemplary system 100 of FIG. 1.

FIG. 9 is a block diagram illustrating an exemplary 2D-to-3D image converter 106 in the exemplary system 100 of FIG. 1. In some embodiments, 2D-to-3D image converter 106 may include, for example, an image content analyzer 902, a conversion method chooser 906, a 3D image generator 908, and an image rendering engine 910. In certain embodiments, 2D-to-3D image converter 106 may also include an image database 904.

It is understood that components of 2D-to-3D image converter 106 shown in FIG. 9 are for illustrative purposes only. Certain components may be removed or combined and other components may be added. Also, one or more of the components depicted in FIG. 9 may be implemented in software on one or more computing systems. For example, such components may comprise one or more software applications, which may comprise one or more computer units including storage devices containing computer-readable instructions which, when executed by a processor, cause a computer to perform steps of a method. Computer-readable instructions may be stored on a tangible non-transitory computer-readable medium, such as a solid-state memory or disk memory. Alternatively, one or more of the components depicted in FIG. 9 may be implemented in hardware components or combinations of hardware and software such as, for example, ASICs, special purpose computers, or general purpose computers.

With reference to FIG. 9, 2D-to-3D image converter 106 receives a 2D image, e.g., an image or a frame of a video. Image content analyzer 902 may analyze content of the 2D image, as described above. The content analysis may include, for example, image categorization (and/or subcategorization), object identification, ect., as presented above.

Image database 904 may be used for storing a collection of data related to 2D-to-3D image conversion based on image content. The storage may be organized as a set of queues, a structured file, a flat file, a relational database, an object-oriented database, or any other appropriate database. Computer software, such as a database management system, may be utilized to manage and provide access to the data stored in image database 904. Image database 904 may store, among other things, configuration information for image content analysis, 2D-to-3D image conversion methods corresponding to content of images, etc. In some embodiments, image database 904 may also store, e.g., depth map generation methods corresponding to content of images, configuration information for generating 3D images based on depth maps, etc.

The configuration information for image content analysis may include but is not limited to, for example, configuration information for image classes, object classes, ect, and/or methods for the above-described image categorization/subcategorization, object identification, or any other type of image content analysis. The 2D-to-3D image conversion methods corresponding to content of images may include but are not limited to, for example, methods for converting 2D images into 3D images based on results of image content analysis (e.g., image categorization/subcategorization and/or object identification), as described above. The depth map generation methods corresponding to content of images may include but are not limited to, for example, methods for generating depth information based on results of content analysis (e.g., image categorization/subcategorization and/or object identification), as described above, or depth models (stored in, e.g., image database 904) such as a simple sphere model or any other more sophisticated 3D model corresponding to image content.

With reference to FIG. 9, image analyzer 902 analyzes content of the 2D image, as described above, based on the configuration information for image content analysis, which is acquired from, e.g., image database 904. Image analyzer 902 passes the analysis result to conversion method chooser 906, which determines or chooses from, e.g., image database 904, a corresponding method for generating a 3D image, as described above. Based on the chosen method, 3D image generator 908 generates a 3D image, as presented above.

In some embodiments, 2D-3D image converter 106 may include a depth map generator. After conversion method chooser 906 chooses a corresponding depth map generation method from, e.g., image database 904, based on the image content analysis result, the depth map generator may employ the chosen method to generate a depth map, as described above. Based on the generated depth map, 3D image generator 908 generates a 3D image, according to configuration information acquired from, e.g., image database 904, as previously presented. In some embodiments, the depth map generator may be a part of 3D image generator 908. After the 3D image is generated, image rendering engine 910 may render the 3D image for output, e.g., display, printing, etc.

During the above-described 2D-to-3D image conversion based on image content, each component of 2D-to-3D image converter 106 may store its computation/determination results in image database 904 for later retrieval or training purpose. Based on the historic data, 2D-to-3D image converter 106 may train itself for improved performance.

The methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, a computer, or multiple computers. A computer program may be written in any form of programming language, including compiled or interpreted languages, and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing 2D-to-3D image conversion based on image content disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for converting a 2D image into a 3D image, the method comprising:
   receiving the 2D image;
   analyzing content of the received 2D image including:
      extracting a first set of visual features from the received 2D image; and
      classifying the received 2D image as one of image categories based on the extracted first set of visual features including:
         classifying the received 2D image as one of a landscape image or a geometric structure image based on the extracted first set of visual features, including:
            converting the received 2D image into a grayscale image;
            detecting edges in the grayscale image;
            calculating an edge direction histogram representing edge directions based on the detected edges;
            extracting edge direction features from the edge direction histogram; and classifying the received 2D image as one of the landscape image or the geometric structure image based on the extracted edge direction features;
determining a 2D-to-3D image conversion method based on a result of the content analysis;
generating the 3D image by applying the determined method to the received 2D image; and
providing the generated 3D image.

2. The method of claim 1, wherein if the 2D image is classified as the landscape image, further comprising:
segmenting objects in the received 2D image; and
identifying each of the segmented objects as one of object classes;
assigning a depth to each of the identified object class;
deriving a depth map based on the assignment; and
generating the 3D image based at least on the derived depth map.

3. The method of claim 1, wherein classifying the received 2D image further comprises:
extracting a second set of visual features from the received 2D image; and
further classifying the received 2D image as one of subcategories of the one of image categories based on the extracted second set of visual features.

4. The method of claim 3, wherein further classifying the received 2D image as one of subcategories of the one of image categories based on the extracted second set of visual features comprises:
further classifying the received 2D image as one of an indoor image or an outdoor image based on the extracted second set of visual features.

5. The method of claim 4, wherein further classifying the received 2D image as one of an indoor image or an outdoor image based on the extracted second set of visual features comprises:
converting a first color space of the received 2D image into a second color space;
dividing the converted image into a plurality of vertical sub-blocks;
generating a color histogram for each color channel in each of the plurality of vertical sub-blocks;
concatenating the generated color histograms;
extracting color distribution features from the concatenated color histograms; and
classifying the received 2D image as one of the indoor image or the outdoor image based on the extracted color distribution features.

6. The method of claim 4, wherein if the image is not detected as the indoor image, further comprising:
detecting a vanishing point in the received 2D image, wherein the received 2D image is an outdoor image;
dividing the received 2D image into a plurality of depth gradient planes based on the detected vanishing point;
assigning each object in the received 2D image to one of the plurality of depth gradient planes;
deriving a depth map based on the assignment; and
generating the 3D image based at least on the derived depth map.

7. The method of claim 4, wherein if the image is detected as the indoor image, further comprising:
detecting a vanishing point in the received 2D image, wherein the received 2D image is an indoor image;
determining a geometric structure for an object in the received 2D image to find a vanishing line;
deriving a depth map based on the detected vanishing point and a geometric direction of the vanishing line; and
generating the 3D image based at least on the derived depth map.

8. The method of claim 1, wherein if the 2D image is classified as the landscape image, then analyzing the content of the received 2D image comprises:
segmenting objects in the received 2D image; and
identifying each of the segmented objects as one of object classes.

9. The method of claim 8, further comprising:
assigning a depth to each of the identified object class;
deriving a depth map based on the assignment; and
generating the 3D image based at least on the derived depth map.

10. The method of claim 1, wherein determining a 2D-to-3D image conversion method based on a result of the content analysis comprises choosing, based on the result of the content analysis, one of algorithms that include:
shifting a left or right eye image;
shifting image pixels depending on their positions;
shifting edges of objects in the 2D image;
generating a depth map; and
employing a 3D model.

11. The method of claim 1, further comprising:
deriving a depth map based on the result of the content analysis.

12. The method of claim 11, further comprising:
generating the 3D image based at least on the derived depth map.

13. An apparatus for converting a received 2D image into a 3D image, the apparatus comprising:
an image content analyzer to analyze content of the received 2D image including:
extracting a first set of visual features from the received 2D image; and
classifying the received 2D image as one of image categories based on the extracted first set of visual features including:
classifying the received 2D image as one of a landscape image or a geometric structure image based on the extracted first set of visual features, including:
converting the received 2D image into a grayscale image;
detecting edges in the grayscale image;
calculating an edge direction histogram representing edge directions based on the detected edges;
extracting edge direction features from the edge direction histogram; and
classifying the received 2D image as one of the landscape image or the geometric structure image based on the extracted edge direction features;
a conversion method chooser to determine a 2D-to-3D image conversion method based on a result of the content analysis;
a 3D image generator to generate the 3D image by applying the determined method to the received 2D image; and
an image rendering engine to provide the generated 3D image.

14. The apparatus of claim 13, further comprising:
an image database to store configuration information for the content analysis, or at least one 2D-to-3D image conversion method corresponding to the content of the 2D image.

15. The apparatus of claim 13, further comprising:
a depth map generator to derive a depth map based on the result of the content analysis.

16. The apparatus of claim 15, wherein the 3D image generator is further configured to:
    generate the 3D image based at least on the derived depth map.

17. A non-transitory computer-readable medium storing instructions that, when executed, cause a computer to perform a method for converting a 2D image into a 3D image, the method comprising:
    receiving the 2D image;
    analyzing content of the received 2D image including:
        extracting a first set of visual features from the received 2D image; and
        classifying the received 2D image as one of image categories based on the extracted first set of visual features including:
            classifying the received 2D image as one of a landscape image or a geometric structure image based on the extracted first set of visual features, including:
                converting the received 2D image into a grayscale image;
                detecting edges in the grayscale image;
                calculating an edge direction histogram representing edge directions based on the detected edges;
                extracting edge direction features from the edge direction histogram; and
                classifying the received 2D image as one of the landscape image or the geometric structure image based on the extracted edge direction features;
    determining a 2D-to-3D image conversion method based on a result of the content analysis;
    generating the 3D image by applying the determined method to the 2D image; and
    providing the generated 3D image.

* * * * *